(12) United States Patent
Chang et al.

(10) Patent No.: US 7,817,890 B2
(45) Date of Patent: Oct. 19, 2010

(54) NANOMOVER FOR OPTICAL ELEMENTS ALIGNMENT WITHOUT DRIVING ELECTRICALLY

(76) Inventors: Sie-Poon Chang, 235 Chung-Ho Box 8-24, Taipei (TW); Peter Chang, 235 Chung-Ho Box 8-24, Taipei (TW)

( * ) Notice: Subject to any disclaimer, the term of this patent is extended or adjusted under 35 U.S.C. 154(b) by 170 days.

(21) Appl. No.: 12/260,091

(22) Filed: Oct. 29, 2008

(65) Prior Publication Data

US 2010/0104252 A1    Apr. 29, 2010

(51) Int. Cl.
G02B 6/32    (2006.01)
G02B 6/46    (2006.01)

(52) U.S. Cl. ............................. 385/52; 385/90; 385/134
(58) Field of Classification Search ................. None
See application file for complete search history.

(56) References Cited

U.S. PATENT DOCUMENTS

| | | | | |
|---|---|---|---|---|
| 6,115,166 A | * | 9/2000 | Kotaki | 359/212.1 |
| 6,879,758 B2 | * | 4/2005 | Liu et al. | 385/52 |
| 7,062,133 B2 | * | 6/2006 | Azimi et al. | 385/52 |
| 7,251,086 B2 | * | 7/2007 | Weber et al. | 359/811 |
| 7,349,604 B2 | * | 3/2008 | Clark | 385/52 |
| 7,409,125 B2 | * | 8/2008 | Azimi et al. | 385/52 |

* cited by examiner

*Primary Examiner*—Tina M Wong

(57) ABSTRACT

A mechanical nanomover for optical elements alignment comprises a platform; a front supporting block and a rear supporting block; a left metal sheet and a right metal sheet installed between the two supporting blocks; a movable block installed between the two metal sheets; a weak spring and a strong spring which are interacted with the movable block. A translation stage serves to drive the weak spring to drive the movable block. The elastic coefficient of the strong spring is much greater than that of the weak spring so that the larger displacement of the weak spring will induce only a small displacement of the movable block due to the interaction of the strong spring. No electric power is needed to drive the structure of the nanomover. The mechanical nanometer can provide a sufficient precision to the operation, while it is very inexpensive.

14 Claims, 10 Drawing Sheets

| An | ΣAn | n*(An)$_{avg}$ | An-(An)$_{avg}$ |
|---|---|---|---|
| 32 | 32 | 66.6 | -34.6 |
| 77 | 109 | 133.2 | 10.4 |
| 51 | 160 | 199.8 | -15.6 |
| 80 | 240 | 266.4 | 13.4 |
| 74 | 314 | 333 | 7.4 |
| 76 | 390 | 399.6 | 9.4 |
| 61 | 451 | 466.2 | -5.6 |
| 23 | 474 | 532.8 | -43.6 |
| 101 | 575 | 599.4 | 34.4 |
| 80 | 655 | 666 | 13.4 |
| 49 | 704 | 732.6 | -17.6 |
| 85 | 789 | 799.2 | 18.4 |
| 32 | 821 | 865.8 | -34.6 |
| 103 | 924 | 932.4 | 36.4 |
| 49 | 973 | 999 | -17.6 |
| 91 | 1064 | 1065.6 | 24.4 |
| 37 | 1101 | 1132.2 | -29.6 |
| 90 | 1191 | 1198.8 | 23.4 |
| 51 | 1242 | 1265.4 | -15.6 |
| 80 | 1322 | 1332 | 13.4 |
| 59 | 1381 | 1398.6 | -7.6 |
| 37 | 1418 | 1465.2 | -29.6 |
| 81 | 1499 | 1531.8 | 14.4 |
| 63 | 1562 | 1598.4 | -3.6 |
| 94 | 1656 | 1665 | 27.4 |
| 56 | 1712 | 1731.6 | -10.6 |
| 82 | 1794 | 1798.2 | 15.4 |
| 63 | 1857 | 1864.8 | -3.6 |
| 74 | 1931 | 1931.4 | 7.4 |
| An | ΣAn | n*(An)$_{avg}$ | An-(An)$_{avg}$ |

Fig.8

NANOMOVER FOR OPTICAL ELEMENTS ALIGNMENT WITHOUT DRIVING ELECTRICALLY

FIELD OF THE INVENTION

The present invention relates to alignment of optical elements; and particularly to a mechanical nanomover for optical elements alignment; in that no electric power is needed to drive the nanomover of the present invention. The moving extent of a weak spring is so large so that the user's hand is sufficient to control a movable block to move only a small sub-micrometer displacement so that the mechanical nanomover of the present invention can provide a sufficient precision to the operation, while it is very cost effective.

BACKGROUND OF THE INVENTION

A nanomover is a device serving to move an object through a very small range, such as several sub-micrometers, or several nanometers, which is especially used in the alignment of optical elements.

With the growth in the optical communication and many other optical applications, optical elements alignment has become the focus of much industrial attention. This is a key production process because the connection efficiency of the optical elements greatly influences the overall production rates and the quality of the connected optical elements for the products used in optical communication.

For example, optical fiber alignment is necessary when two optical fibers are connected, when an optical fiber is connected to a photo diode or a light emission diode and when an optical fiber array is connected to an optical wave guide.

Metallic wire connection is relatively easy because an electric current will flow as long as the two wires are in contact. The connection between two optical elements, such as optical fibers, however, requires much greater precision, in the order of sub-micro-meters. Therefore, experienced technicians are needed for optical elements alignment, but as such technicians are limited in supply, this causes a bottleneck to the mass production of components for optical communications.

Automatic alignment system can shift slightly the light axes of two optical elements, such as optical fibers to minimize transmission loss. Once alignment is complete, the light axes are fixed by laser processing or a setting resin. FIG. 10 shows the organization of the typical alignment system. The system consists of a light source, alignment stages, a stage controller, a power meter to measure the light intensity, and a controlling PC. The alignment stage moves the tip of one optical fiber with sub-micrometer precision using step motors. The PC controller receives information from the power meter and feedbacks the information to the stage controller to control the alignment stage. The control signals are generated by the PC where the alignment is executed.

In above structure, the step motor can be replaced by a piezoelectric element which can convert electric energy into mechanic action so as to drive the clamp arm with a V groove locating an optical fiber.

Above mentioned structures are driven electrically and can achieve a desired precision for moving the clamp arm with a minor distance in sub-micrometer ranges. However this device is very expensive and must be driven electrically.

Thus, there is an eager demand for a novel design which can improve the above mentioned disadvantages.

SUMMARY OF THE INVENTION

Accordingly, the primary object of the present invention is to provide a mechanical nanomover for optical elements alignment; in this device, no electric power is needed to drive the structure of the nanomover. The moving extent of a weak spring is so large so that the user's hand is sufficient to control a movable block to only move through a small displacement. Thus the mechanical nanomover can provide a sufficient precision to the operation, while it is very cost effective.

To achieve above objects, the present invention provides a mechanical nanomover for optical elements alignment which comprises a platform; a front supporting block and a rear supporting block placed upon the platform; a left metal sheet and a right metal sheet installed between the two supporting blocks; a movable block installed between the two metal sheets; a weak spring and a strong spring which are interacted with the movable block. A translation stage serves to drive the weak spring to drive the movable block. Other than the front supporting block and the rear supporting block, all the elements are located not to contact the platform so as to provide a frictionless system in operation. The elastic coefficient of the strong spring is much greater than that of the weak spring so that the larger displacement of the weak spring will induce only a small displacement of the movable block due to the interaction of the strong spring. The mechanical nanomover can provide a sufficient precision to the operation, while it is very cheap.

In the present invention, the weak spring 601 is an elastic reed and the strong spring 602 is another elastic reed. Furthermore, the driving unit 700 is a translation stage which has an axle; one end of the axle is connected to the weak spring and another end of the axle is threaded to a casing of the translation stage. The front supporting block 201 and the rear supporting block 202 are rigid bodies.

Moreover, in the present invention, a preload is added to the moveable block. In an assembly state, the strong spring is compressed with a very little extent so as to apply a predetermined preload to the moveable block and thus the right metal sheet 301 and left metal sheet 302 will also deform with the same extent experienced by the moveable block 400.

The various objects and advantages of the present invention will be more readily understood from the following detailed description when read in conjunction with the appended drawing.

BRIEF DESCRIPTION OF THE DRAWINGS

FIGS. 7-1, 7-2 are perspective views showing the second embodiment of the present invention.

FIG. 8 shows the experimental result according to the device of the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
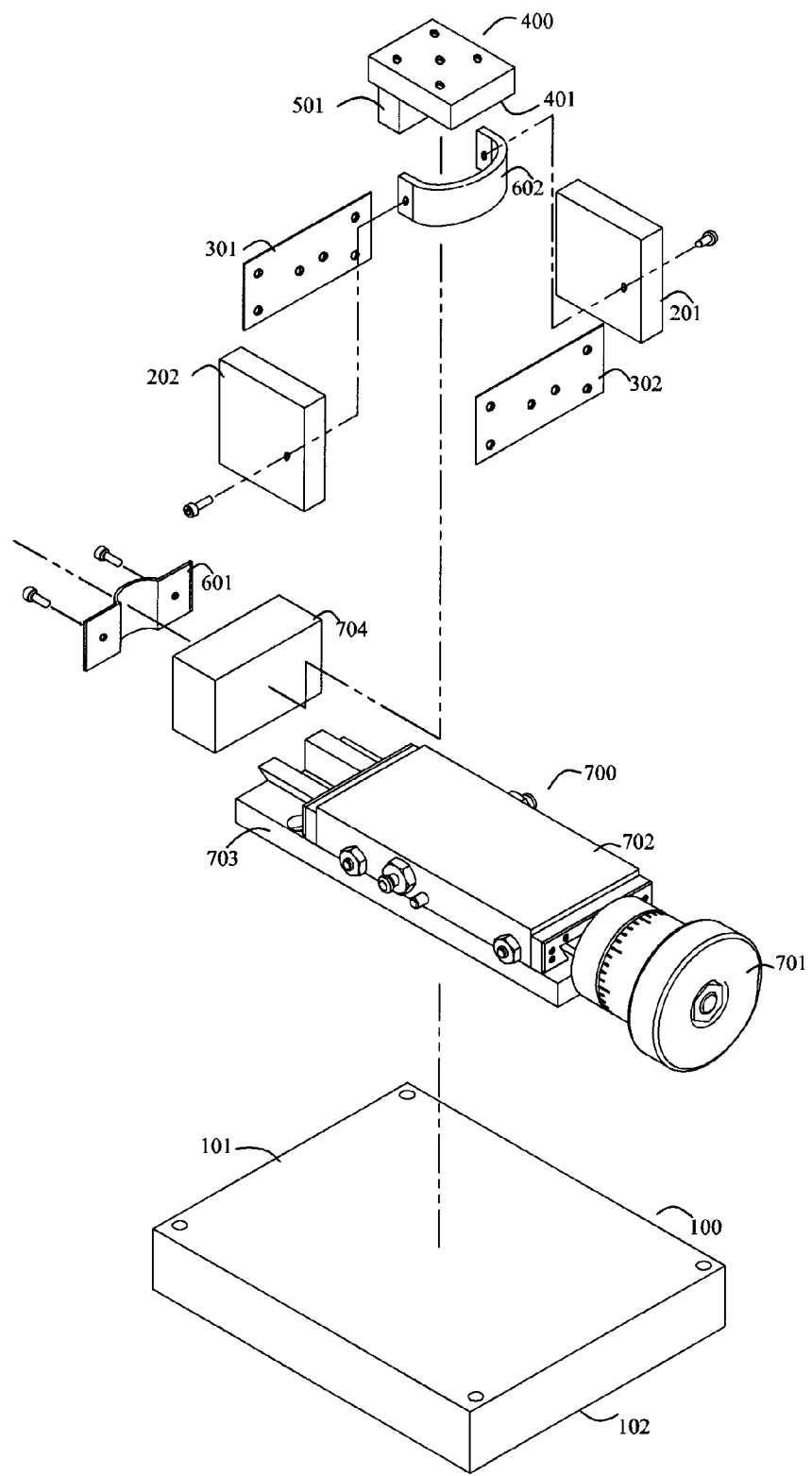
FIG. 1 is an exploded perspective view showing the elements of the present invention in the first embodiment of the present invention.
Figure 2:
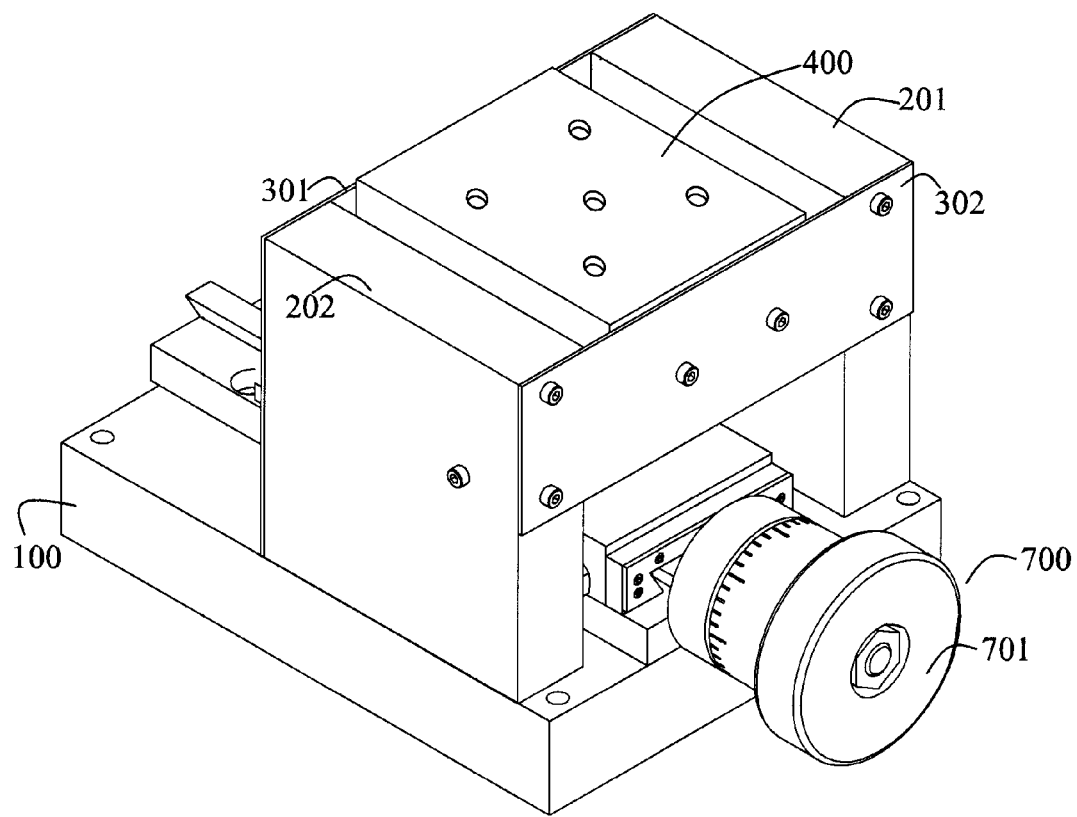
FIG. 2 shows an assembly view of the present invention.
Figure 3:
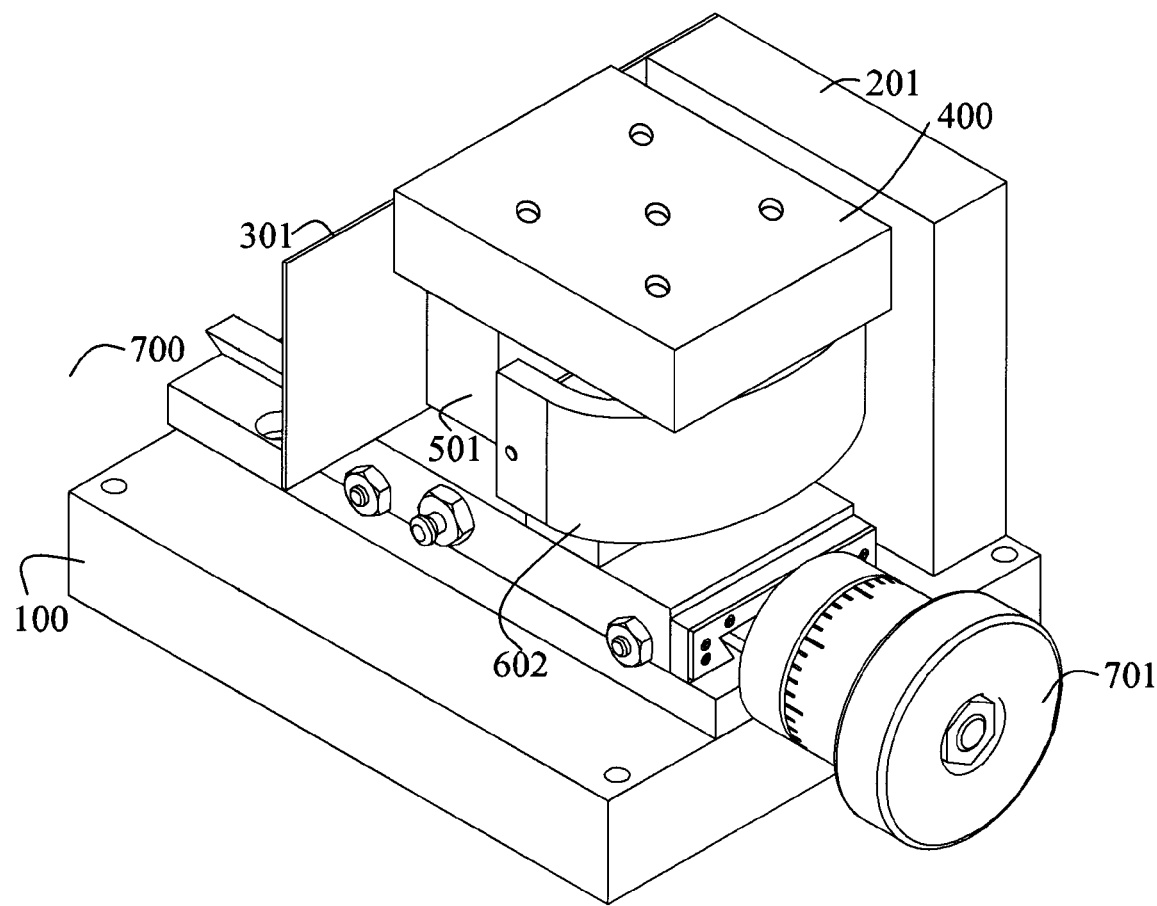
FIG. 3 is a partial perspective view of the present invention in the first embodiment of the present invention, where the elements 202 and 302 are removed for showing the interior of the structure of the present invention.
Figure 4:
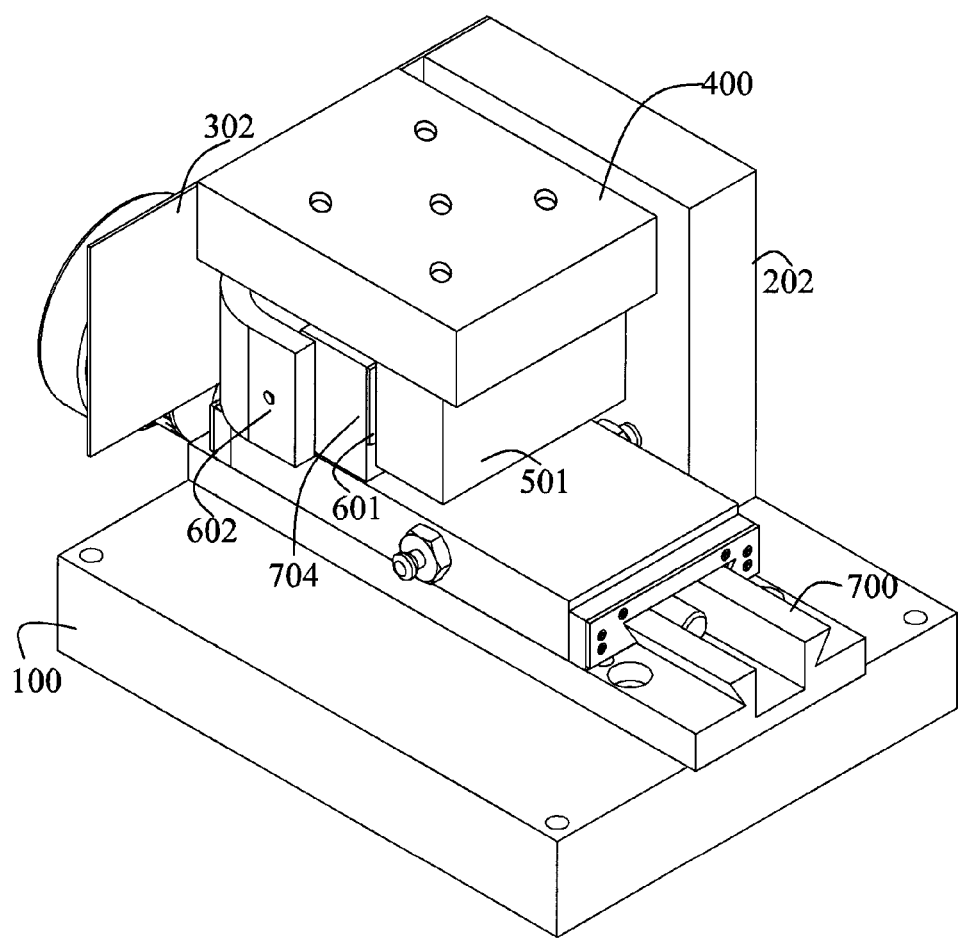
FIG. 4 is another partial perspective view of the present invention in the first embodiment of the present invention, where the elements 201 and 301 are removed for showing the interior of the structure of the present invention.
Figure 5:
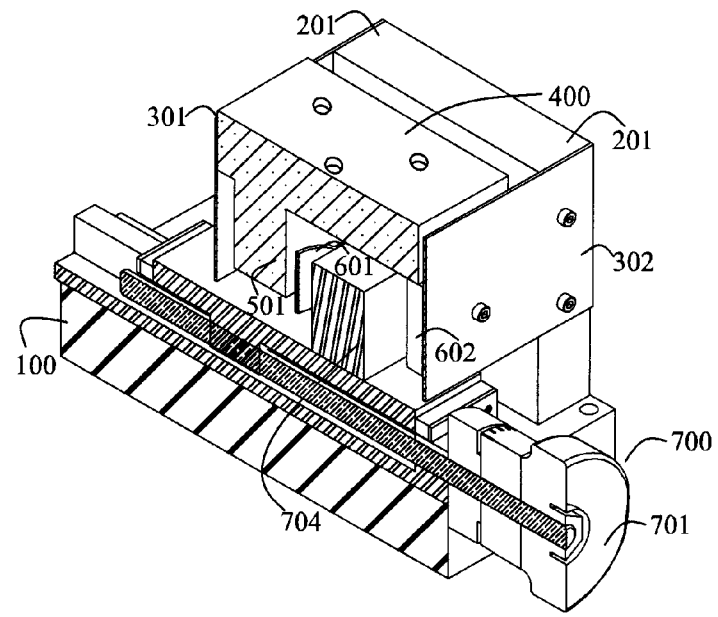
FIG. 5 shows a cross sectional view about the assembled state of the present invention.
Figure 6:
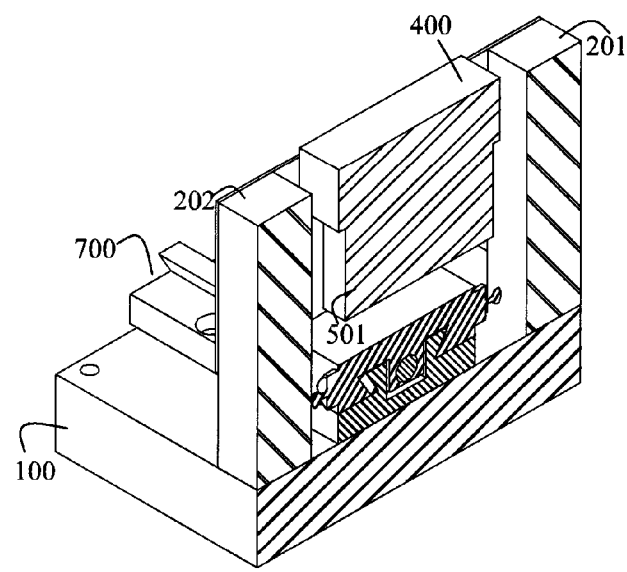
FIG. 6 shows another cross sectional view about the assembled state of the present invention, which is viewed from a side vertical to the side shown in FIG. 5.

With referring to FIGS. 1, 2, 3, 4, 5 and 6, where FIG. 1 is an exploded perspective view showing the elements of the present invention in the first embodiment of the present invention. FIG. 2 shows an assembly view of the present invention. FIG. 3 is a partial perspective view of view of the present invention. FIG. 3 is a partial perspective view of the present invention in the first embodiment of the present invention, where the elements 202 and 302 are removed for showing the interior of the structure of the present invention. FIG. 4 is another partial perspective view of the present invention in the first embodiment of the present invention, where the elements 201 and 301 are removed for showing the interior of the structure of the present invention. FIG. 5 shows a cross sectional view about the assembled state of the present invention. FIG. 6 shows another cross sectional view about the assembled state of the present invention, which is viewed from a side vertical to the side shown in FIG. 5. The elements of the present invention will be described in the following.

A platform 100 has an upper surface 101 and a lower surface 102. Preferably, the upper surface 101 is a flat surface.

A front supporting block 201 and a rear supporting block 202 are firmly installed upon the upper surface 101 of the platform 100. For example, the front supporting block 201 and the rear supporting block 202 can be embedded into, or screwed to or locked to the upper surface 101 of the platform 100. In the drawing, the screw connection is illustrated. The front supporting block 201 and the rear supporting block 202 are retained with a distance for receiving other elements of the present invention. In the present invention, the front supporting block 201 and the rear supporting block 202 are rigid bodies and thus are difficult to deform in the operation of the device of the present invention.

A right metal sheet 301 and a left metal sheet 302 are arranged between and firmly secured to the front supporting block 201 and the rear supporting block 202. The right metal sheet 301 is spaced from the left metal sheet 302. The right metal sheet 301 and the left metal sheet 302 are suspended between the front supporting block 201 and rear supporting block 202 and are not contact with any surface of the platform 100. The right metal sheet 301 and left metal sheet 302 are made of flexible material. That is to say, the right metal sheet 301 and left metal sheet 302 are slightly elastic and thus deformable within a slight extent.

A movable block 400 is arranged between the right metal sheet 301 and left metal sheet 302 and is firmly secured thereto. A lower surface 401 of the movable block 400 is spaced from the upper surface 101 of the platform 100. In the present invention, for example the movable block 400 is screwed to the right metal sheet 301 and left metal sheet 302 so that the movable block 400, right metal sheet 301 and left metal sheet 302 are formed as a rigid structure, that is, no relative movement between the movable block 400 and the left metal sheet 302 and between the movable block 400 and the right metal sheet 301. As the movable block 400 moves, the left metal sheet 302 and right metal sheet 301 are also moved with the same extent. No relative movement exists therebetween.

In operation, the optical element for alignment can be placed upon the moveable block 400, for example, if the optical element is an optical fiber, than a clamp arm is located upon an upper surface 402 of the moveable block 400. The clamp arm has a V shape groove for locating an optical fiber. In alignment of two optical fibers, it is necessary to fine-adjust the moveable block 400 so as to drive the clamp arm to align with another one. However the core of a fiber is very tiny, generally, it has a size of micrometers. Thus the movement of the optical fiber is just a few micrometers. Therefore, it is needed to have a design which cause the moveable block 400 to move several micrometers in many steps with each step in the range of several sub-micrometers, while these minor steps must be controllable by the operation. The following elements of the present invention cause this idea could be realized, while electric power is unnecessary.

A first rod 501 is connected to the lower surface 401 of the movable block 400, while do not contact the upper surface 101 of the platform 100.

A weak spring 601 has a middle section connected to the first rod 501. The weak spring 601 has a small elastic coefficient K1.

A strong spring 602 has two ends which are firmly secured (or exampled screwed) to the front supporting block 201 and rear supporting block 202. The middle section of the strong spring 602 is contact to the right metal sheet. The strong spring 602 has a large elastic coefficient K2. The large elastic coefficient K2 is much greater than the small elastic coefficient K1. For example the large elastic coefficient K2 is 50 times or 100 times of the small elastic coefficient K1.

In the present invention, it is preferable, that the weak spring 601 and the strong spring 602 are elastic reeds which could provide a steady operation which is a main concern in the present invention. Generally, elastic reeds are preferred than helical springs. However all elastic springs are suitably used in the present invention after they are especially selected and designed, and thus all these are within the scope of the present invention.

A translation stage 700 is connected to the weak spring 601. Adjustment of the translation stage 700 will release or tighten the weak spring 601. However the main design of the translation stage 700 is to tighten (and thus compress) the weak spring 601 or extend (and thus prolong) the weak spring 601, that is to adjust the length of the weak spring 601.

Thus, other structure suitable for above mentioned function is permissible to be used in the present invention. As illustrated in the drawing, we depict that the translation stage 700 is protruded out from a lower side of the right metal sheet 301, but this is not confined to confine the scope of the present invention. Other design suiting for the operation of the translation stage 700 is permissible in the present invention.

In the present invention, other driving apparatus which can compress or expand the weak spring 601 is also within the scope of the present invention.

In the present invention, the translation stage 700 serves to convert screwing operation into linear operation. In the drawing, it is illustrated that the translation stage 700 has a screwing head 701 for driving the plate 702 to move along a base 703. The retaining block 704 is locked to the plate 702. Two ends of the weak spring 601 are locked to the retaining block 704. In operation, screwing the head 701 will cause that weak spring 601 to move forwards or backwards.

Operation of the present invention will be described herein. Initially, the structure of the present invention is at a wholly released state. That is to say, the weak spring 601 is completely released without compression or extension. Then the translation stage 700 is screwed forwards to push the weak spring 601 forwards. The movement of the weak spring 601 will drive the first rod 501 also moves forwards. As a result, the movable block 400 will move leftwards to drive the left metal sheet 302 and right metal sheet 301 to also move leftwards. However the movement of the moveable block 400 is interacted with the strong spring 602 through the right metal sheet 301, while the strong spring 602 has a large elastic coefficient K2 which is far greater than that of weak spring 601. For example, herein we assume that the large elastic coefficient K2 is 100 times of the small elastic coefficient K1. Thus the strong spring 602 will strongly retain the moveable block 400 not to move, while the weak spring 601 tries to move the moveable block 400 with a greater extend. As a result, the moveable block 400 only moves through a little distance. From physical calculation, the movement of the moveable block 400 is only K1/K2 of the movement of the weak spring 601. In this example, the movement of the moveable block 400 is only 1/100 of the movement of the weak spring 601. Thus as the weak spring 601 moves through 10 μm (micrometer), the moveable block 400 will move through 0.1 μm. Thus, the moveable block 400 is fine-adjusted.

Furthermore, in the present invention, to reduce the vibration of the whole structure, a preload is added to the moveable block 400. That is, in an assembly state, the strong spring 602 is deformed with a predetermined extent so as to apply a load to the moveable block 400 and thus the right metal sheet 301 and left metal sheet 302 will also deform with the same extent experienced by the moveable block 400. The deformations of the right metal sheet 301 and the left metal sheet 302 are along a direction counter to that of the pushing forward direction of the weak spring 601. This preload will cause that the structure of the present invention has the ability to prevent from vibration.

Moreover, it should emphasize that the present invention can prevent from the interference of friction force, that is, it is frictionless. In the present invention, the moveable block 400, left metal sheet 302 and right metal sheet 301 are suspended and spaced from the upper surface 101. They do not contact with the upper surface 101 of the platform 100. In the driving operation of the weak spring 601, the moveable block 400, right metal sheet 301 and left metal sheet 302 are formed as a rigid body. No relative movement occurs between any two elements and thus no friction generates. The frictionless property is helpful to the precision of the system. As known in the art, the friction will reduce the precision due to the transfer of force is ineffective and the operator can not precisely estimate the effect of the friction. As a result, the precision of system is reduced. However the tricked design of the present invention has greatly reduced the effect of friction force.

Figures 1, 7:
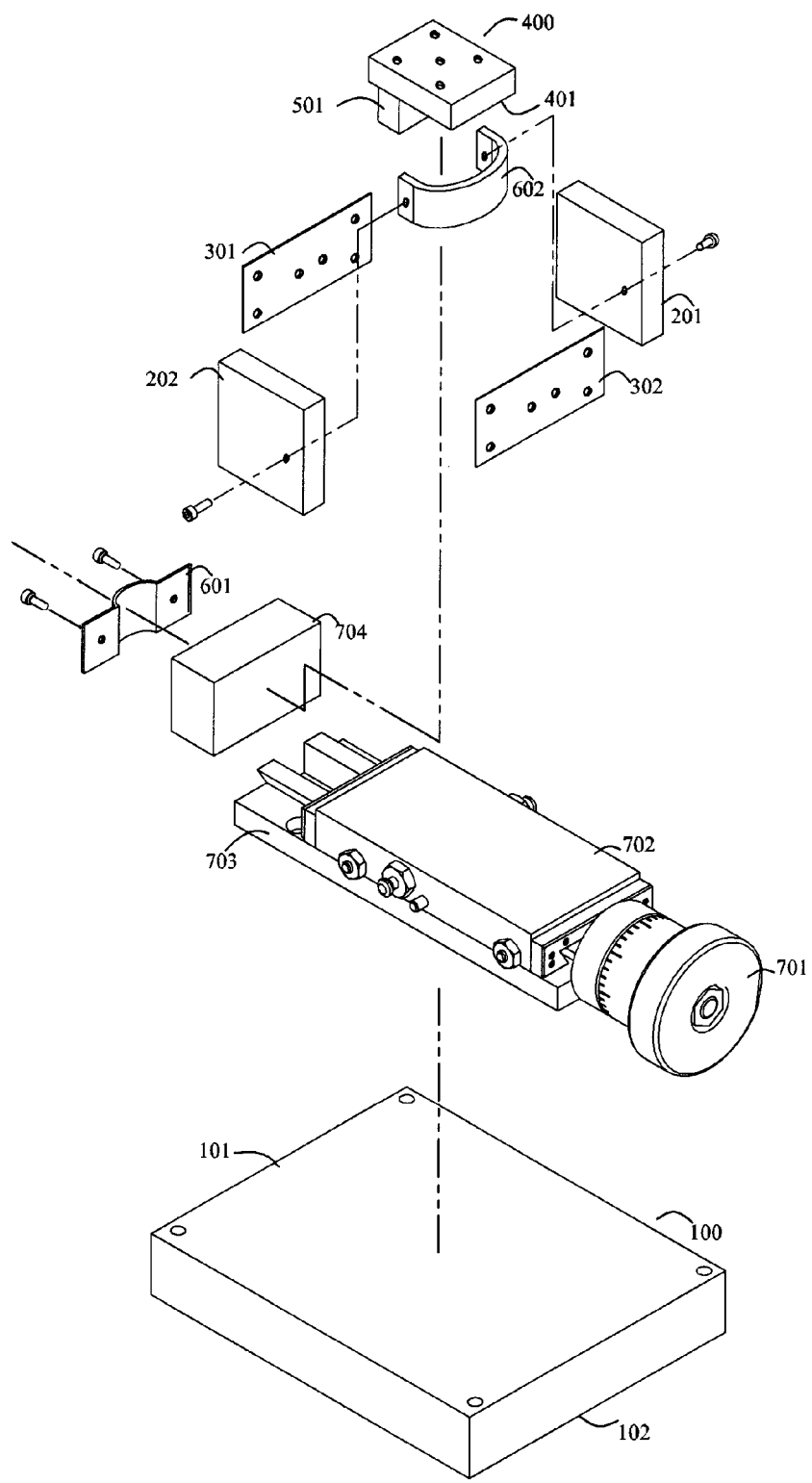
Figures 2, 7:
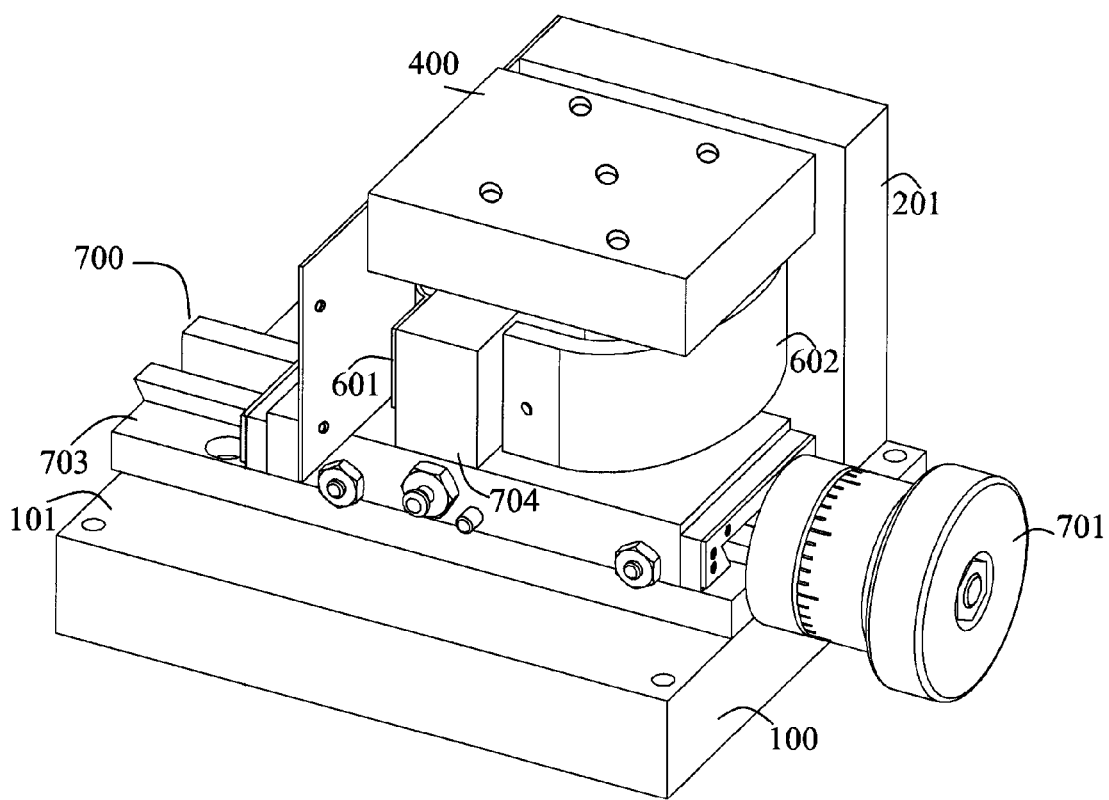

In the second embodiment, as illustrated in FIG. 7, in this embodiment, those identical to the above embodiment will not be further described herein. Only those different from above embodiment are described. However all the elements of the second embodiment are identical to those in the first embodiment, only that no first rod 501 is used. The weak spring 601 is directly applied to the left metal sheet 302. This also has the same effect as above said and thus the details will not be further described herein.

Figure 9:
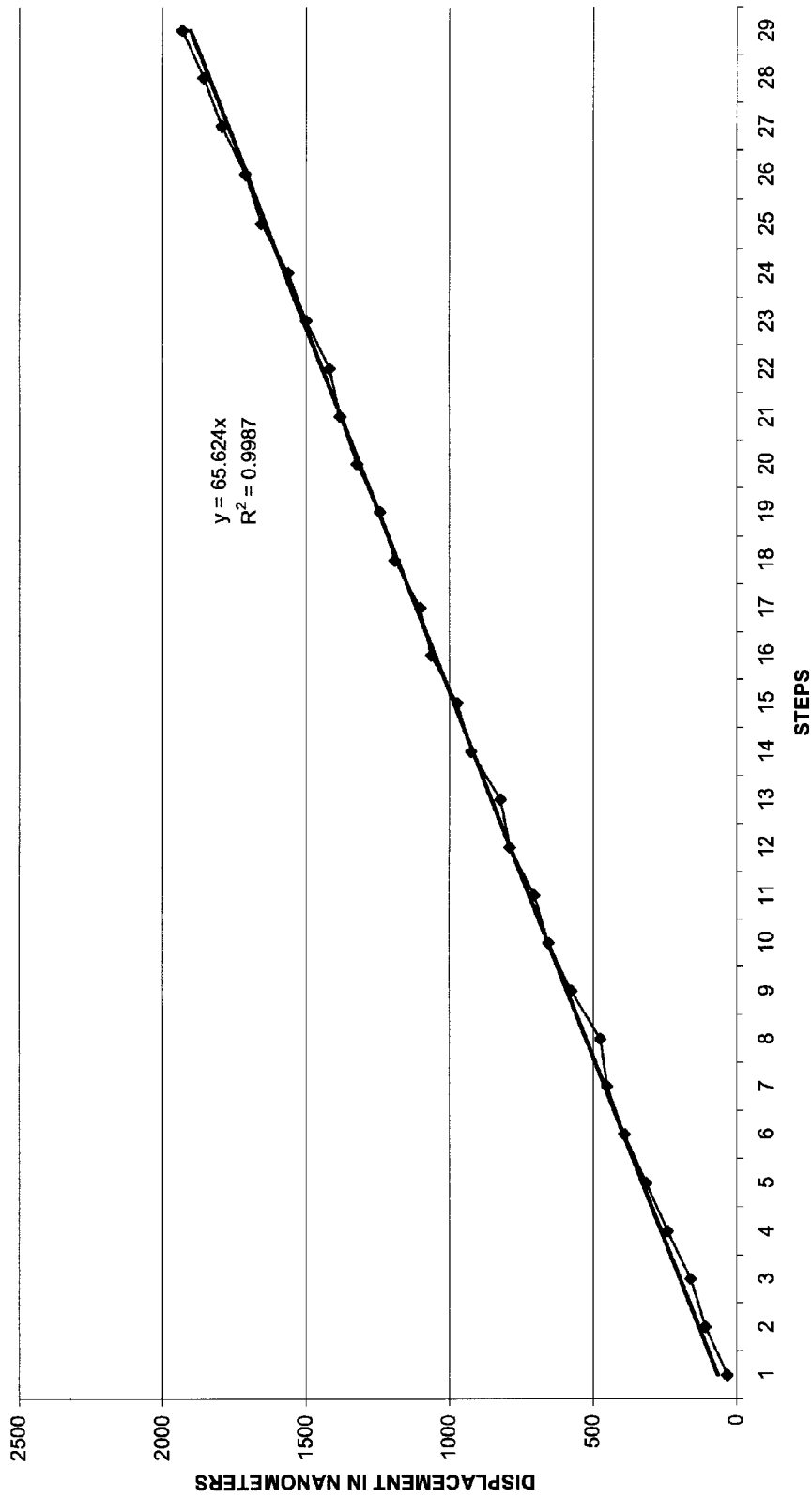
FIG. 9 is a linear approximation of the results in FIG. 8.
Figure 10:
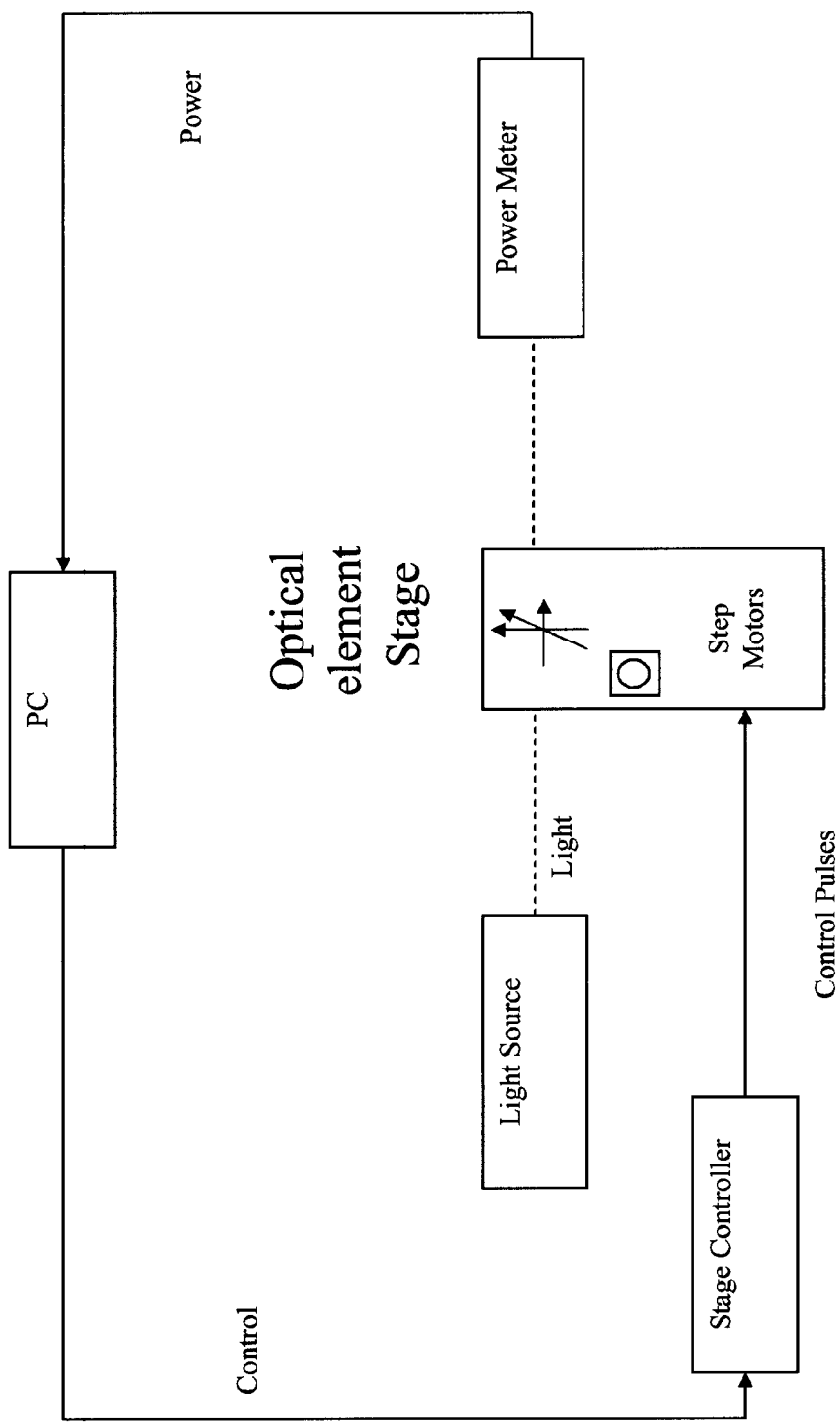
FIG. 10 shows the prior art optical elements alignment structures.

Referring to FIGS. 8 and 9, the effect of the present invention is illustrated. In FIG. 8, the data in first and second lines (viewed from left side) show the individual moving distance and the accumulated distance in each adjusting step by rotating the translation stage. The third lines shows a linear approximation of the data in the second line. The data in fourth line shows the differences between the second and third lines. In the second line of FIG. 8, it shows that each moving step will cause a movement of the moveable block 400 to move through about 66 nanometers. This is suitable for the adjustment of optical elements. For example, a diameter of a core of a fiber is about 10 micrometers. Thus 66 nanometers is 1/150 of the diameter of the core. The step is small enough so that the optical element (optical fiber) can be precisely aligned.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A mechanical nanomover for optical elements alignment, comprising:
    a platform (100) having an upper surface (101) and a lower surface (102);
    a front supporting block (201) and a rear supporting block 202 firmly installed upon the upper surface (101) of the platform 100; the front supporting block (201) and the rear supporting block (202) being retained with a distance for receiving other elements;
    a right metal sheet (301) and a left metal sheet (302) arranged between and firmly secured the front supporting block (201) and the rear supporting block (202); and the right metal sheet (301) being spaced from the left metal sheet (302); the right metal sheet (301) and the left metal sheet (302) being not contact with any surface of the platform (100); and the right metal sheet 301 and left metal sheet 302 are deformable;
    a movable block (400) being firmly secured between the right metal sheet (301) and left metal sheet (302);
    a lower surface of the movable block (400) being spaced from the upper surface (101) of the platform (100); the movable block (400), right metal sheet (301) and left metal sheet (302) being combined as a rigid structure,
    a first rod 501 being connected to a lower surface (401) of the movable block (400);
    a weak spring (601) having a middle section connected to the first rod (501); the weak spring (601) has a small elastic coefficient K1;
    a strong spring (602) having two ends which are firmly secured to the front supporting block (201) and rear supporting block (202); a middle section of the strong spring (602) being contact to the right metal sheet (301); the strong spring (602) having a large elastic coefficient K2; the large elastic coefficient K2 being much greater than the small elastic coefficient K1; and
    a driving unit (700) having one end connected to another end of the weak spring (601); adjustment of the driving unit (700) will compress or expanding the weak spring (601).

2. The mechanical nanomover for optical elements alignment as claimed in claim 1, wherein the weak spring (601) is an elastic reed and the strong spring (602) is another elastic reed.

3. The mechanical nanomover for optical elements alignment as claimed in claim 1), wherein the driving unit (700) is a translation stage which serves to convert screwing operation into linear operation; the translation stage (700) has a screwing head (701) for driving the plate (702) to move along a base (703); the retaining block (704) is locked to the plate (702); two ends of the weak spring (601) are locked to the retaining block (704); and screwing the head (701) will cause that weak spring (601) to move forwards or backwards.

4. The mechanical nanomover for optical elements alignment as claimed in claim 1, wherein the front supporting block (201) and the rear supporting block (202) are rigid bodies.

5. The mechanical nanomover for optical elements alignment as claimed in claim 1, wherein a preload is added to the moveable block.

6. The mechanical nanomover for optical elements alignment as claimed in claim 1, wherein in an assembly state, the strong spring (602) is deformed with a predetermined little extent so as to apply a preload to the moveable block (400) and thus the right metal sheet (301) and left metal sheet (302) will also deform with the same extent experienced by the moveable block (400).

7. The mechanical nanomover for optical elements alignment as claimed in claim 1, wherein the right metal sheet (301) and left metal sheet (302) have slightly elastic and thus deformable within a slight extent.

8. A mechanical nanomover for optical elements alignment, comprising:
   a platform (100) having an upper surface (101) and a lower surface (102);
   a front supporting block (201) and a rear supporting block (202) firmly installed upon the upper surface (101) of the platform (100); the front supporting block (201) and the rear supporting block (202) being retained with a distance for receiving other elements;
   a right metal sheet (301) and a left metal sheet (302) arranged between and firmly secured the front supporting block (201) and the rear supporting block (202); and the right metal sheet (301) being spaced from the left metal sheet (302); the right metal sheet (301) and the left metal sheet (302) being not contact with any surface of the platform 100; and the right metal sheet (301) and left metal sheet (302) are made of flexible material; that is to say, the right metal sheet (301) and left metal sheet (302) have slightly elastic and thus deformable within a slight extent;
   a movable block (400) being firmly secured between the right metal sheet (301) and left metal sheet (302); a lower surface (401) of the movable block (400) being spaced from the upper surface (101) of the platform (100); the movable block (400), right metal sheet (301) and left metal sheet (302) being combined as a rigid structure;
   a weak spring (601) having a middle section connected to the left metal sheet (302);
   a strong spring (602) having two ends which are firmly secured to the front supporting block (201) and rear supporting block (202); a middle section of the strong spring (602) being contact to the right metal sheet (301); the strong spring (602) having a large elastic coefficient K2; the large elastic coefficient K2 being greater than the small elastic coefficient K1; and
   a driving unit (700) having one end connected to another end of the weak spring (601); adjustment of the driving unit (700) will compress or expanding the weak spring (601).

9. The mechanical nanomover for optical elements alignment as claimed in claim 8, wherein the weak spring (601) is an elastic reed and the strong spring (602) is another elastic reed.

10. The mechanical nanomover for optical elements alignment as claimed in claim 8, wherein the driving unit (700) is a translation stage which serves to convert screwing operation into linear operation; the translation stage (700) has a screwing head (701) for driving the plate (702) to move along a base (703); the retaining block (704) is locked to the plate (702); two ends of the weak spring (601) are locked to the retaining block (704); and screwing the head (701) will cause that weak spring (601) to move forwards or backwards.

11. The mechanical nanomover for optical elements alignment as claimed in claim 8, wherein the front supporting block (201), the rear supporting block (202) and the platform 100 are rigid bodies.

12. The mechanical nanomover for optical elements alignment as claimed in claim 8, wherein a preload is added to the moveable block.

13. The mechanical nanomover for optical elements alignment as claimed in claim 8, wherein in an assembly state, the strong spring (602) is compressed with a very little extent so as to apply a predetermined load to the moveable block (400) and thus the right metal sheet (301) and left metal sheet (302) will also deform with the same extent experienced by the moveable block (400).

14. The mechanical nanomover for optical elements alignment as claimed in claim 8, wherein the right metal sheet (301) and left metal sheet (302) have slightly elastic and thus deformable within a slight extent.

* * * * *